United States Patent [19]

Kultzow et al.

[11] 3,978,359
[45] Aug. 31, 1976

[54] COIL END INSULATION FOR DYNAMOELECTRIC MACHINES

[75] Inventors: Robert J. Kultzow, Croton-on-Hudson, N.Y.; Leonard B. Simmonds, Monroeville, Pa.

[73] Assignee: Westinghouse Electric Corporation, Pittsburgh, Pa.

[22] Filed: Oct. 30, 1974

[21] Appl. No.: 519,159

[52] U.S. Cl. .................................. 310/260; 310/45
[51] Int. Cl.² .......................................... H02K 3/46
[58] Field of Search .............. 310/194, 58, 260, 68, 310/270, 59, 272, 60 A, 271, 64, 213, 54, 45, 43; 336/185, 208; 428/426

[56] References Cited
UNITED STATES PATENTS

| | | | |
|---|---|---|---|
| 3,010,038 | 11/1961 | Manni | 310/64 |
| 3,151,260 | 9/1964 | MacCracken | 310/260 |
| 3,185,872 | 5/1965 | Weissheimer | 310/213 |
| 3,344,297 | 9/1967 | Bishop | 310/260 |
| 3,388,458 | 6/1968 | Logan | 310/271 |
| 3,614,493 | 10/1971 | Collings | 310/64 |
| 3,691,416 | 9/1972 | Drexler | 310/260 |

*Primary Examiner*—R. Skudy
*Attorney, Agent, or Firm*—G. H. Telfer

[57] ABSTRACT

A construction is provided for the stator coil ends of large dynamoelectric machines such as turbine generators of the inner-cooled type which effectively insulates the ends of the gas coils and mechanically reinforces them without interfering with ventilation. An insulating vent cap is applied over the ventilating tubes at each end of each conductor. The vent caps have a soft, uncured portion and are fitted to the conductor and then impregnated with a resin and cured in place to obtain a good fit of the cap on the conductor. The complete coil ends and connections are then covered with an insulating and mechanically reinforcing tape.

6 Claims, 6 Drawing Figures

COIL END INSULATION FOR DYNAMOELECTRIC MACHINES

BACKGROUND OF THE INVENTION

The present invention relates to the stator windings of large dynomoelectric machines such as turbine generators, and more particularly, to the insulation and mechanical support of the stator coil ends of such machines.

Large turbine generators are usually of the inner cooled, or direct cooled, construction in which a coolant fluid is circulated through duct means in the stator and rotor slots in direct thermal relation with the current-carrying conductors inside the ground insulation. This type of construction provides a very effective cooling system which has made it possible to obtain the high capacities required in large generators without exceeding the permissible limits of physical size. In most cases, the coolant fluid used in hydrogen which fills the gas-tight housing of the machine and is circulated by a blower on the rotor shaft through the ducts of the rotor and stator windings and through radial or axial ducts in the stator core. The stator windings of these machines are made up of stranded conductors disposed in the slots of the stator core and suitably connected at their ends to form complete coils. The conductors are cooled by means of ventilating ducts which are arranged in either one or two stacks disposed between columns of conductor strands and which extend throughout the length of the conductor in the stator slots and the ends portions. The ends of the ducts extend outward from the conductors and are open for circulation of the coolant gas.

In the usual arrangement, two conductors are placed in each slot of the stator core and the ends of each conductor extend beyond the core and are formed in a complex curve extending around the core and terminating in an end portion adjacent to the end portion of another conductor lying in a different slot. These adjacent conductor end portions are connected together to form complete coils which are suitably connected to form the stator winding. In many cases, especially where two stacks of ventilating ducts are used in each conductor, the stator coil extreme end portions and the end connections between conductors have been left uninsulated, since these portions of the coil are well removed from the grounded core. The reason for this has been primarily to facilitate ventilation and to allow easy inspection of the soldered connections between conductors which include group transpositions of the stranded conductors. Failures of the connections and end turn portions have occurred, however, which are due in many cases to vibration and fatigue which may cause breaking of some of the strands leading to an electrical failure. Other types of mechanical failures have also occurred and better mechanical strength and reinforcement of these connections and coil end portions are needed. An insulating cover is also desirable for the exposed ends of the metal ventilating ducts.

SUMMARY OF THE INVENTION

The invention provides for insulating the stator coil end portions of a large dynamoelectric machine in a manner which provides both adequate mechanical reinforcement and effective insulation. In accordance with the invention, an insulating vent cap is provided for each end of each conductor consisting of a cap member having a preformed rigid rectangular end portion which fits over the end of the conductor and the ventilating tubes, and which also has a soft unimpregnated body portion open on one side extending back over the conductor. This body portion of the vent cap is pressed onto the conductor and is then impregnated with a suitable resin and cured in place so as to be effectively fitted on the coil with adequate bonding of all parts of the vent cap to the conductor. The entire coil end including the connection between conductors is then covered with suitable insulating material, preferably resin impregnated insulating tape, which effectively insulates the coil ends and provides the desired mechanical support and reinforcement.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
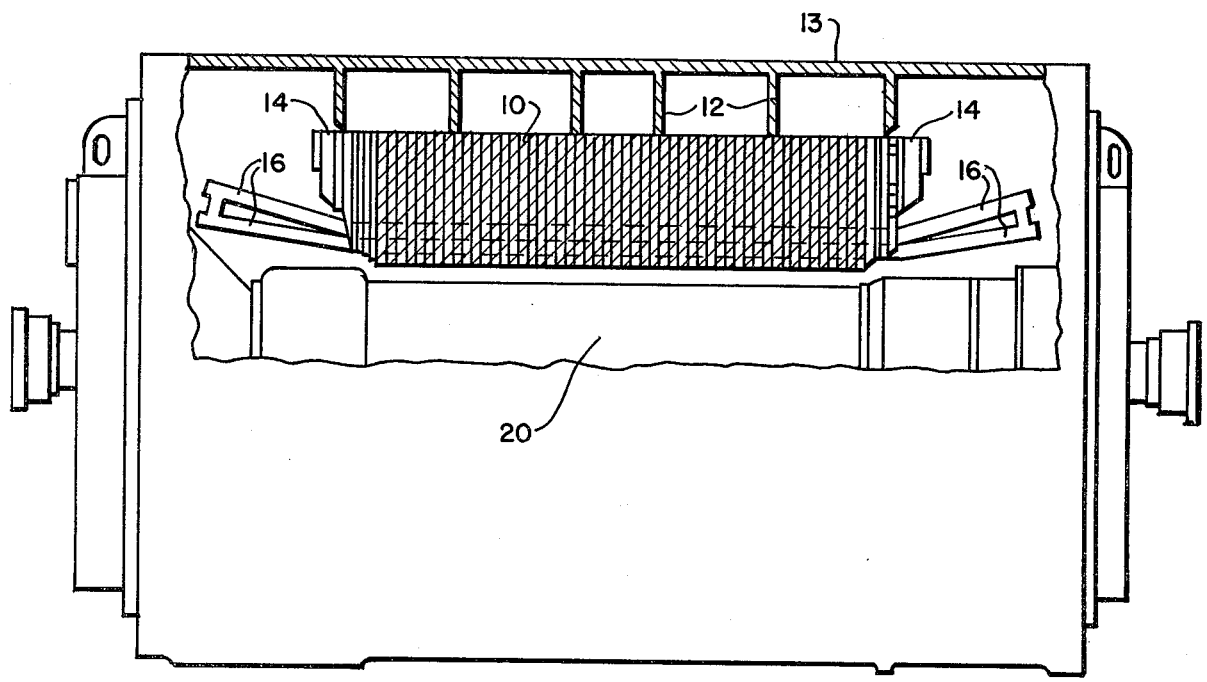
FIG. 1 is a view, partly in longitudinal section and partly in elevation, of a turbine generator embodying the invention.

Referring first to FIG. 1 of the drawing, the invention is shown embodied in a large turbine generator of typical construction, although it will be understood that the invention may be utilized in machines of any desired construction.

As shown, the generator has a stator core 10 supported by frame rings 12 in a substantially gas-tight outer housing 13. The stator core 10 is of the usual laminated type having a generally cylindrical bore therethrough. The core 10 is built up of laminations arranged in spaced stacks to provide radial vent ducts (not shown) in the usual manner, and the laminations are clamped between suitable end plates 14. The stator core 10 has longitudinal slots in its inner periphery for the reception of a stator winding of any suitable type consisting of a plurality of winding conductors 16 which constitute half-coils connected at their ends to form complete coils and a complete stator winding.

Figure 2:
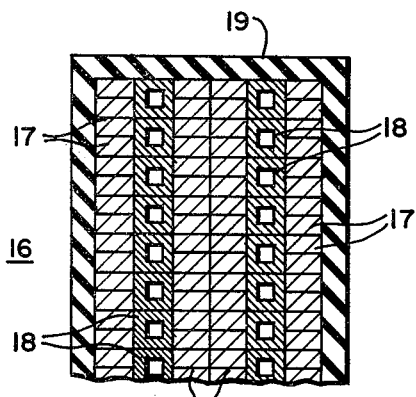
FIG. 2 is a transverse sectional view of a typical conductor of the type to which the invention is applicable.

The stator winding is of the inner-cooled construction and, as shown in FIG. 2, each conductor comprises a plurality of conductive strands 17 and metal ventilating tubes or ducts 18. In the illustrative embodiment shown, which is typical of large machines with heavy load currents in the stator windings, each conductor 16 consists of four columns of strands 17 which are arranged in two parts of columns and transposed in any desired manner such as the well-known Roebel transposition. Two stacks of ventilating ducts 18 are provided, each stack of ventilating ducts being placed between the two columns of strands of one pair, the transposition crossovers (not shown) being made across the ventilating ducts 18. In this way, each column of strands is in good thermal relation with the ventilating ducts and the most effective ventilation is obtained. It will be understood, of course, that in some cases only a single stack of ducts 18 may be used with either two or four columns of strands. The portions of the conductor which lie in the slots of the stator core 10 are, of course, enclosed in the usual heavy ground insulation 19 which extends beyond the core almost to the end of the conductor as can be seen in FIG. 3, for example.

A rotor 20 is disposed in the bore of the stator core 10 and supported in bearings of any suitable type mounted in the ends of the housing 13. The bearing assemblies preferably include gland seals to prevent leakage of gas along the rotor shaft. The bearings and gland seals may be of any suitable construction and have not been illustrated as they are not part of the invention. The rotor 20 is provided with a field winding of usual type and may be of any desired construction. The housing 13 of the machine is filled with a suitable coolant gas, preferably hydrogen, which is maintained at a desired pressure in the housing and is circulated through the ducts 18 of the stator winding and through the ducts of the rotor windings and the stator core in any desired manner such as by a blower (not shown) on the rotor.

As previously described, each of the stator winding conductors 16 extends beyond the core 10 at each end, and each end of each conductor is formed in the usual manner to extend around the core into position for connection to the end of another conductor lying in a different slot. The extreme ends of each such pair of conductors are disposed adjacent each other as shown in FIG. 3. The strands 17 of each conductor 16 are transposed in the slot portion, as previously described, and in order to compensate for voltages induced in the end turn portions of the coils the strands 17 are divided into insulated groups 22 and the groups are transposed by connecting the groups of strands of each conductor to appropriate groups of strands of the other conductor by means of connectors 24 soldered or otherwise joined to the strands to connect the conductors to form a coil. The ventilating ducts 18 of each conductor 16 extend through the end turn portions of the conductors to the ends and there extend straight outwardly as shown in FIG. 3, the ends of the ducts being open for flow of ventilating gas therethrough. As previously discussed, these coil ends and connections have heretofore usually been uninsulated to permit ready inspection of the group transposition connections and to facilitate ventilation. In accordance with the present invention, however, means are provided for insulating the coil ends and connections in a manner which does not interfere wit ventilation and which provides effective mechanical support for the otherwise unsupported end connections, in order to avoid the possibility of failures due to vibration and fatigue as well as the possibility of certain types of electrical failure which may sometimes result from the presence of exposed high-voltage conductors lying near each other.

Figure 3:
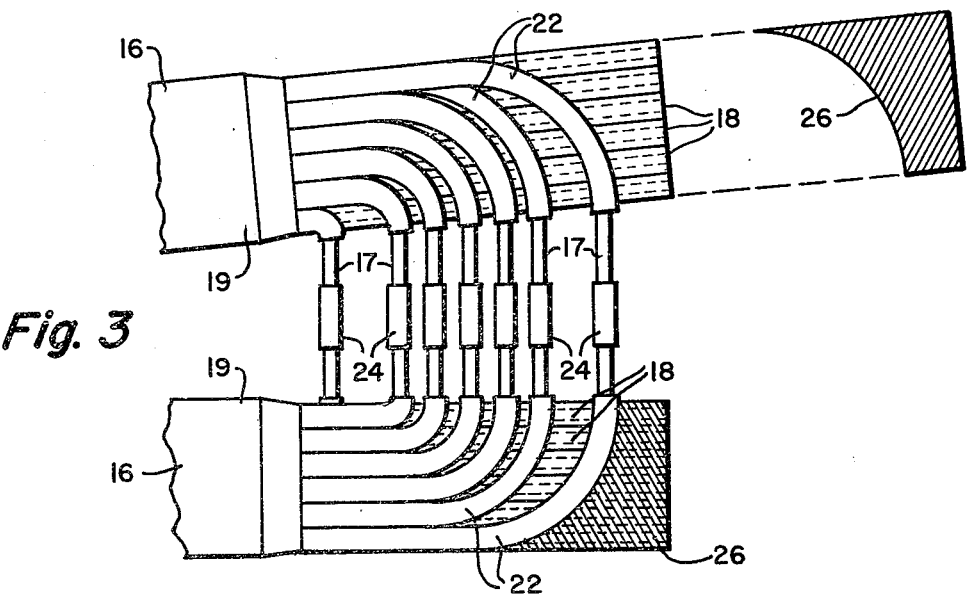
FIG. 3 is a view of a stator coil end illustrating the first step in applying the coil end insulation.

The first step in the insulating process of the present invention is illustrated in FIG. 3. As there shown, a pad 26 of a suitable insulating material, which is preferably dacron felt or an equivalent material, is cut to the shape indicated to fit around the end of the outermost group of conductor strands and lie against the stack of ventilating ducts 18. A suitable number of pads 26 is provided for each end of each conductor 16 to fill the spaces on each side of and between the stacks of ducts of 18. The pad 26 are then soaked in a suitable resin, such as an epoxy resin of a type which will cure at room temperature, and the pads are placed in position and built up to sufficient thickness to fill the spaces adjacent the ends of the ventilating ducts 18. A single piece of similar material impregnated with the same resin is then preferably placed over the entire end of each conductor extending over both sides back to the insulation 19 and across the top of the conductor in a generally U-shaped configuration.

Figure 4:
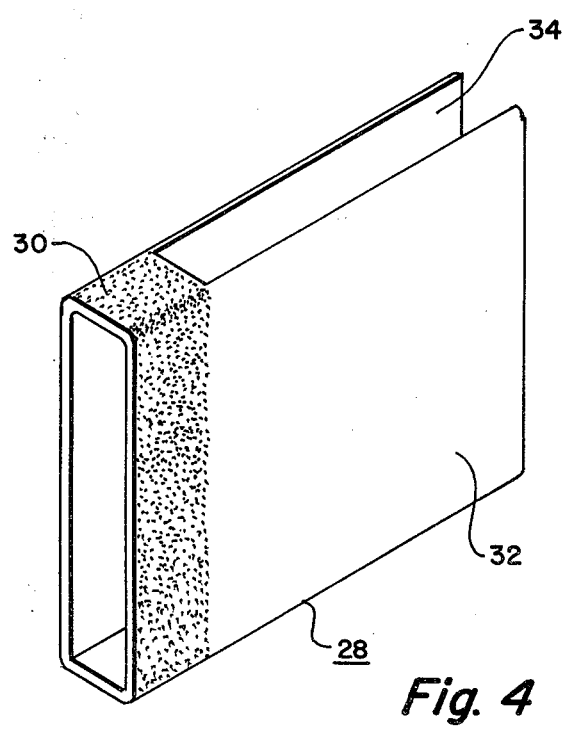
FIG. 4 is a perspective view of a vent cap.

While the material so placed on the coil ends is still soft and uncured, a vent cap 28 is placed over each conductor end. The preferred construction of this vent cap is shown in FIG. 4. As there shown, the cap 28 consists of a generally box-shaped member which may be built up of a plurality of layers of glass cloth formed in any desired manner such as by wrapping on a mandrel. One end of the vent cap 28 is impregnated with a high temperature epoxy resin, or other suitable type of resin, during manufacture and this end of the vent cap is cured by heating to form a rigid, generally rectangular end portion 30. The remaining or body portion 32 of the vent cap is not impregnated at this time and remains soft and flexible as it consists only of dry glass fabric. One of the narrow sides of the vent cap body 32 is cut out as indicated at 34 so that the body portion 32 is channel shaped.

Figure 5:
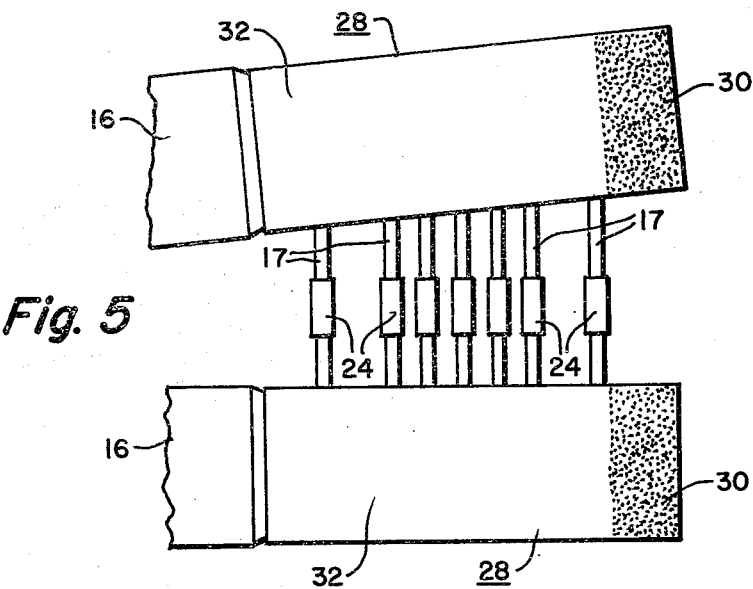
FIG. 5 is a view of the coil end portion showing the vent cap in place.

After the dacron pads 26 have been placed as indicated in FIG. 3 and described above, a vent cap 28 is placed over each conductor end as shown in FIG. 5. As there shown, the rigid rectangular end 30 of the vent cap is placed over the ends of the ventilating ducts 18 and is disposed so as to extend a short distance, which may be about one inch, beyond the ends of the vent tubes. The still soft body portion 32 of the vent cap extends over the rest of the conductor end, the cut-out bottom 34 permitting ready placement of the vent cap in this position. The uncured body portion 32 of the vent cap is then pressed down on the still uncured underlying dacron insulation to conform accurately to the shape and surface contours of the conductor. The body portion 32 of the vent cap 28 is then impregnated with a room temperature epoxy resin which may be the same as that used in the dacron pads. The resin may be applied by brushing the resin on or otherwise, and the vent cap 28 and underlying dacron insulation are pressed tightly in place on the entire side surfaces of the conductor end by suitable clamps and the resin is allowed to cure. The vent cap is thus rigidly held in position on the conductor end, being essentially integral with the underlying insulation, and conforms exactly to the conductor surface.

Figure 6:
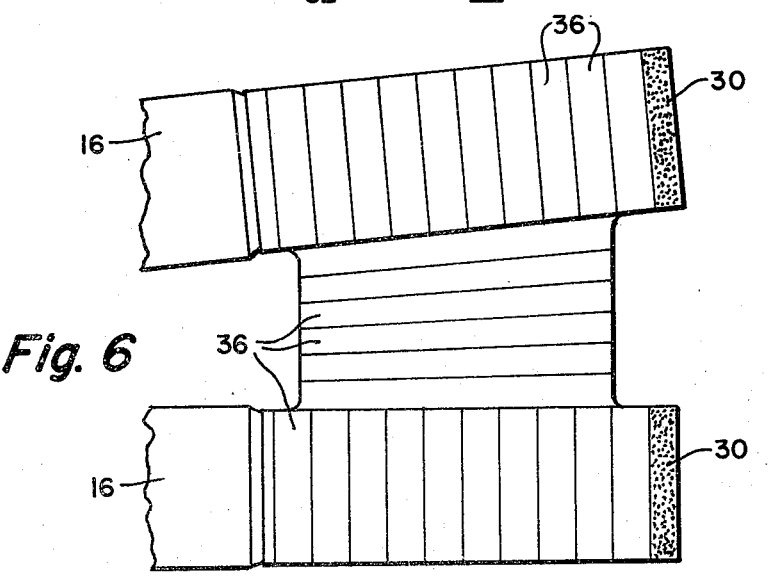
FIG. 6 is a view showing the completely insulated coil end portion.

The connections between conductors are then insulated by covering the connectors 24 and associated portions of the strands 17 with a layer of dacron felt which is covered with preferably two layers of a silicone rubber type. The entire conductor ends and connection portions, forming the coil end, are then covered with several layers of glass type 36 containing an epoxy resin. The entire coil end area including the vent caps is thus covered, as shown in FIG. 6, and after being completely taped the assembly is clamped and the resin cured.

This construction results in a well insulated coil end construction which is adequately supported mechanically in a manner to substantially prevent the failures which have occurred because of vibration and fatigue, the conductor strands and ventilating ducts being solidly bonded together in a manner to prevent individual vibration of a strand or group of strands. The vent caps permit the effective insulation described without interferring with ventilation and their construction is such that they can be applied and well bonded to the coil in a manner which could not be done with a completely rigid box-type device. The insulation effectively prevents many types of electrical failures which were heretofore possible because of the great increase in the electrical strength between adjacent coil ends, as well as the protection against the possibility of foreign objects falling on an exposed joint and causing a short-circuit. The possibility of failures spreading around the stator from one conductor to the next in case of ann arcing type of failure is also prevented since there are no exposed conducting surfaces. Certain preferred materials have been described for the purpose of illustration but it will be understood that other suitable insulating materials and resins could be used if desired. The particular details of construction shown are, of course, only illustrative and other equivalent structures may be utilized.

What is claimed is:

1. In a dynamoelectric machine having a stator member, a plurality of coils constituting a stator winding, each of said coils comprising two conductors spaced apart on the stator member and having end portions disposed adjacent each other for connection together, each of said conductors comprising a plurality of strands and at least one stack of ventilating ducts, the ducts extending outwardly of said end portions, and a vent cap covering each end conductor, each of said vent caps having an end portion of glass fibers impregnated with a resin and precured in a generally rectangular configuration, said end portion enclosing the extremities of the ventilating ducts and extending beyond them, and each vent cap having a body portion of glass fibers integral with the end portion, said body portion covering and conforming to the end portion of the conductor and being impregnated with a resin cured in place on the conductor.

2. The combination of claim 1 in which each vent cap has a generally rectangular rigid end portion of glass fibers impregnated with an epoxy resin, and a body portion of glass fibers integral with the end portion and open on one sie to fit over the conductor, said body portion being initially flexible and unimpregnated.

3. The combination of claim 1 including means for connecting together the adjacent end portions of the conductor strands, and insulating means covering said connecting means and conductor end portions.

4. A dynamoelectric machine comprising:
 a stator core supported in a substantially gastight housing, said core having longitudinal slots in the inner periphery thereof;
 a stator winding located in said slots comprising conductors of a plurality of conductive strands with a plurality of ventilating ducts intimately associated with said strands, end portions of said strands extending beyond said core and selectively interconnected to form winding end turns, said ventilating ducts extending substantially longitudinally outward from said end turns with open ends within said housing;
 a winding end turn insulation structure comprising a plurality of vent caps of insulating material, each of said vent caps having a substantially rigid and rectangular open end portion fitting over said open ends of a group of said ventilating ducts and a body portion, integral with said end portion, covering and substantially conforming to a group of strands of said winding end turn, each of said vent caps comprising glass fibers impregnated with an epoxy resin.

5. A dynamoelectric machine in accordance with claim 4 wherein: said winding end turn insulation structure further comprises, under said vent caps, members of insulating material filling space between said strands and said ventilating ducts, said members also impregnated with an epoxy resin.

6. A dynamoelectric machine in accordance with claim 5 wherein: said winding end turn insulation structure further comprises, over said vent caps and said winding end turns, a wrapping of insulating material also impregnated with an epoxy resin.

* * * * *